(12) United States Patent
Lee et al.

(10) Patent No.: US 7,730,016 B2
(45) Date of Patent: Jun. 1, 2010

(54) IDENTIFICATION OF FALSE AMBIGUOUS ROOTS IN A STACK CONSERVATIVE GARBAGE COLLECTOR

(75) Inventors: Robert Lee, Sunnyvale, CA (US); Harlan Sexton, Palo Alto, CA (US); Peter Benson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 859 days.

(21) Appl. No.: 11/048,553

(22) Filed: Jan. 31, 2005

(65) Prior Publication Data
US 2006/0173897 A1    Aug. 3, 2006

(51) Int. Cl.
G06F 7/00 (2006.01)
G06F 17/00 (2006.01)

(52) U.S. Cl. .............................. 707/102; 711/E12.009; 711/E12.012

(58) Field of Classification Search .................. None
See application file for complete search history.

(56) References Cited

U.S. PATENT DOCUMENTS

| | | | |
|---|---|---|---|
| 4,907,151 A | 3/1990 | Bartlett | |
| 5,128,885 A * | 7/1992 | Janis et al. | 714/45 |
| 5,355,483 A * | 10/1994 | Serlet | 711/154 |
| 5,590,332 A | 12/1996 | Baker | |
| 5,652,883 A * | 7/1997 | Adcock | 707/206 |
| 5,848,423 A * | 12/1998 | Ebrahim et al. | 707/206 |
| 6,093,216 A | 7/2000 | Adl-Tabatabai et al. | |
| 6,317,869 B1 | 11/2001 | Adl-Tabatabai et al. | |
| 6,671,707 B1 | 12/2003 | Hudson et al. | |
| 6,981,004 B2 * | 12/2005 | Ganesh et al. | 707/202 |
| 2002/0112227 A1 * | 8/2002 | Kramskoy et al. | 717/148 |
| 2003/0126352 A1 * | 7/2003 | Barrett | 711/100 |
| 2004/0015920 A1 * | 1/2004 | Schmidt | 717/153 |
| 2004/0139272 A1 * | 7/2004 | Rodriguez-Rivera et al. | 711/100 |
| 2006/0002471 A1 * | 1/2006 | Lippincott et al. | 375/240.16 |

* cited by examiner

*Primary Examiner*—Khanh B Pham
*Assistant Examiner*—Azam Cheema
(74) *Attorney, Agent, or Firm*—Aka Chan LLP

(57) ABSTRACT

Techniques for memory management or analysis with conservative garbage collectors is provided. The native stack is analyzed during runtime to identify within frames references to objects in the heap space. An amount of memory is calculated that represents the memory implicated by the reference. A log can be generated that conveys the frame, location of the reference in the frame and amount of memory implicated by the reference.

31 Claims, 8 Drawing Sheets

IDENTIFICATION OF FALSE AMBIGUOUS ROOTS IN A STACK CONSERVATIVE GARBAGE COLLECTOR

BACKGROUND OF THE INVENTION

The present invention relates to management of memory in a computer. More specifically, the invention relates to conservative garbage collection.

Many computer systems provide for dynamic allocation of data objects. The performance of these systems relies on the ability to reclaim memory and re-use memory for dynamically allocated objects after the objects are no longer being used by an executing program. In practice, an object is considered unused when no reference on a computer system refers to the object. When no reference refers to an object, the object is referred to as being dead. Garbage collection includes the process of automatically reclaiming memory allocated to dead objects.

One conventional method of garbage collection is the "tracing" approach. A trace is the identification of objects which may be referenced, directly or indirectly, through a reference in a root set. A root set is one or more areas of memory that contain references which refer to, directly or indirectly, objects that are considered to be "live" for the purposes of garbage collection. A base set is a set of root sets that are traced by a garbage collector to find all the live objects in issue in the area of memory being managed by the garbage collector. Any object not identified through a trace of the root sets in the base set are considered dead, and memory allocated to the object may be reclaimed. For example, object A, object B, and object C reside in memory A. Call stack S is a root set. A reference from call stack S refers to object A, and a reference within object A refers to object B. Object A is thus directly referenced by the reference in call stack S and, object B is indirectly referenced by the reference in call stack S. A trace through the call stack identifies object A and object B, but not object C. Object C is therefore dead, and memory allocated to object C may be reclaimed.

The tracing approach poses several problems for computer systems that use large amounts of memory to store objects. Because execution of processes running on the computer system (e.g., real-time applications) are paused during garbage collection, and a trace accesses all the active objects, long delays in the execution of the processes may occur. Furthermore, accessing all the objects on a computer system violates the presumption of locality of reference that underlies virtual memory operating systems, and may result in excessive memory page thrashing.

These problems have prompted the development of the generational approach to garbage collection. Under the generational approach, two or more areas of memory are used to store objects according to age. The generational approach takes advantage of the empirical observation that newly created ("young") objects tend to "die" quickly (i.e., become unused). Newly created objects under a threshold size (small objects tend to have small life times) are stored in an area of memory referred to as a "nursery."

Under the generational approach, as the object in a nursery ages (e.g., remains alive after a threshold number of garbage collection cycles), the objects are moved from the nursery into another area of memory for storing older objects. Because the nursery contains the newer objects, the memory that is most often reclaimed and reallocated is clustered (i.e., in the nursery). Furthermore, garbage collection is performed more often on objects in the nursery. Thus, under the generational approach, locality of reference is improved.

One common approach to collecting memory from a nursery is the copying approach. Under the "copying" approach, an area of memory (i.e., the nursery) is divided into semispaces. One semispace is designated as the "to-space," and one is designated as the "from-space." Live objects are stored in the from-space, and newly created objects are allocated memory from the from-space. An innovative approach to garbage collection is described in U.S. Pat. No. 6,421,689, which is hereby incorporated by reference for all purposes.

When there is insufficient memory to allocate for a new object, garbage collection is performed. Objects identified as live through a trace are copied into the to-space. Because most objects in a nursery are dead due to the short life span of the objects, after copying the live objects the total memory allocated to objects in the to-space is much smaller than that was allocated in the from-space. The difference represents reclaimed memory.

In addition to copying objects, a reference referring to any object that was copied must be reset to refer to the new location of the copied object. Finally, the to-space is established as the current from-space, and the former from-space becomes the current to-space. New objects are allocated memory from the reclaimed portion of the newly established from-space.

Some computer languages lack runtime typing of data. It is not always possible to identify at runtime the references used by programs written in such languages. Garbage collectors used to manage the objects used by such programs are hampered by the difficulty in distinguishing object references from other types of data structures (e.g., integers, characters). A memory area that may contain one or more references (e.g., pointers) that may not be distinguishable from other types of data structures stored in the memory area is referred to as an ambiguous root set. A "C" call stack is an example of an ambiguous root set (i.e., a four byte entity stored in the call stack might represent a reference or a procedure parameter of the type integer).

The term "ambiguous reference" refers to a portion of memory (e.g., the number of bytes in a pointer) which may or may not be a reference, but if evaluated as a reference refers to an area of memory occupied by objects. An object referred to by an ambiguous reference is considered to be live and may not be moved to another memory location for the following reason. After moving such an object, the ambiguous reference could not be modified because the ambiguous reference might in fact not be a reference, but instead, may be, for example, an integer. On the other hand, moving the object without modifying the ambiguous reference would break a reference to the object, if indeed the ambiguous reference was in fact a reference.

With Java virtual machines ("VMs"), interpreted code is executed in the same address space as compiled native code, such as C code. As the VM needs to perform garbage collection and the Java objects being collected may be referenced by this C code, it is necessary for the garbage collector ("GC") to deal with the C code. There are two common approaches for this.

One solution is to have the C functions "register" the Java objects they are using before they receive a reference to the object. Similarly, when the C functions are done with an object, they send a message that they no longer need the object. This is called "precise garbage collection." A disadvantage of this is that the C code has to be written in a way that is less performant, stylized and harder to maintain.

Another solution is to have the GC scan the C stack frames and registers to identify potential references to Java objects. Objects that are identified are marked in some manner that they are live. This is called "conservative garbage collection." One disadvantage of this is that objects identified as live cannot be relocated. Another disadvantage is that the GC will sometimes identify what appears to be a reference to an object when, in fact, it is not and is an artifact of a previous computation or just a random bit pattern.

With conservative garbage collection, it can also be very difficult to identify the problem when a program that should work fails because the program ran out of memory due to the over-conservative nature on the part of the GC (i.e., identified references did not refer to live objects). These cases can also appear randomly and it can be difficult for users to provide test cases that reliably reproduce the error. Even if such a test case is available, it can be very difficult to determine what C code is responsible for the false references that are causing the failure.

Accordingly, it would be beneficial to have innovative techniques for debugging memory issues in a stack conservative GC. Additionally, it would be beneficial if the techniques did not require a detailed understanding of the code of the program of interest.

SUMMARY OF THE INVENTION

The present invention provides innovative techniques for memory management or analysis with conservative garbage collectors. In general, the native stack is analyzed during runtime to identify within frames references to objects in the heap space. An amount of memory is calculated that represents the memory implicated by the reference. A log (e.g., file) can be generated that conveys the frame, location of the reference in the frame and amount of memory implicated by the reference. Some specific embodiments of the invention are described below.

In one embodiment, the invention provides a method of analyzing memory usage with conservative garbage collection. A native stack is analyzed to identify a reference in a frame to an object in a heap. An amount of memory implicated by the reference is determined upon reference to the object. The frame, location of the reference in the frame and amount of memory implicated by the object are conveyed to a user. For example, the frame, location of the reference in the frame and amount of memory implicated by the object can be written to a log.

In another embodiment, the invention provides a method of analyzing memory usage with conservative garbage collection. Objects in an exact set in a heap are marked. A native stack is analyzed to identify a reference in a frame to an object in a heap, the object not being in the exact set. An amount of memory implicated by the reference is determined upon reference to the object. The frame, location of the reference in the frame and amount of memory implicated by the object are conveyed to a user.

In yet another embodiment, the invention provides a method of analyzing memory usage with conservative garbage collection. A native stack is analyzed to identify a reference in a frame to an object in a heap. An amount of memory implicated by the reference is determined upon reference to the object. A local variable that corresponds to the reference is identified. The local variable and amount of memory implicated by the object are conveyed to a user. Additionally, the frame for the local variable can also be conveyed.

Other features and advantages of the invention will become readily apparent upon review of the following description and association with the accompanying drawings, where the same or similar structures are designated with the same reference numerals.

DETAILED DESCRIPTION OF PREFERRED EMBODIMENTS

In the description that follows, the present invention will be described in reference to embodiments that perform memory management analysis for conservative stack garbage collectors. An exemplary garbage collector will be described in order to aid in understanding the invention. However, embodiments of the invention are not limited any particular architecture, environment, application, or implementation. For example, the invention may be advantageously applied to other garbage collector implementations. Therefore, the description of the embodiments that follows is for purposes of illustration and not limitation.

Hardware Overview

Figure 1:
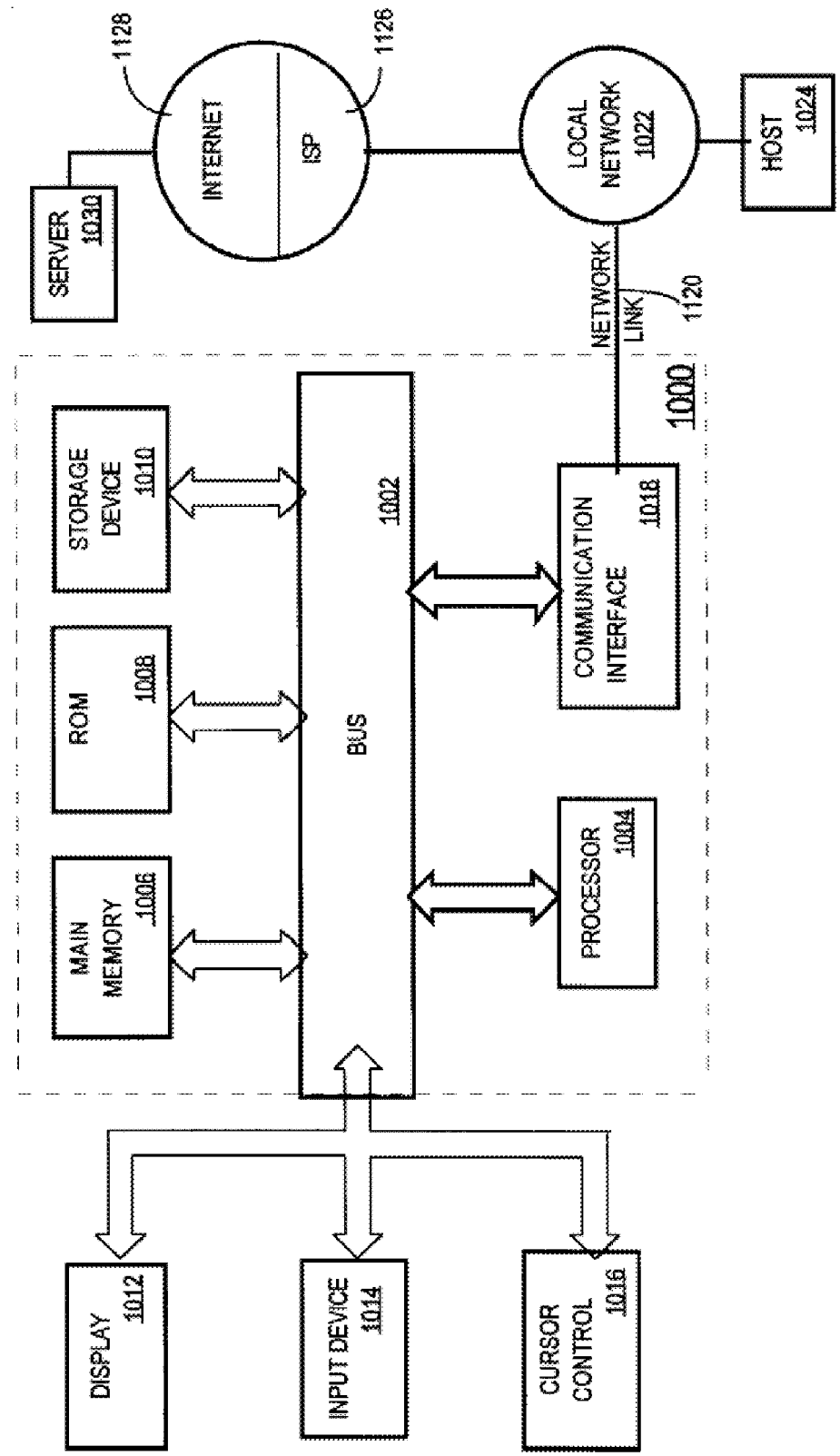
FIG. 1 is a block diagram depicting a computer system upon which an embodiment of the present invention may be implemented.

FIG. 1 is a block diagram that illustrates a computer system 1000 upon which an embodiment of the invention may be implemented. Computer system 1000 includes a bus 1002 or other communication mechanism for communicating information, and a processor 100 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Garbage collection is provided by computer system 1000 in response to processor 1004 executing one or more sequences of one or more instructions or computer code contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions or computer code to processor 1004 for execution. Such a medium may take many forms, including but not limited to, non-volatile media, volatile media, and transmission media. Nonvolatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. A computer program product (such as for analyzing memory usage) comprises computer code.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for garbage collection as described herein.

The received code may be executed by processor 1004 as it is received, and/or stored in storage device 1010, or other non-volatile storage for later execution. In this manner, computer system 1000 may obtain application code in the form of a carrier wave.

Terminology

The term "precise reference" is a reference that the garbage collector knows to be a reference to an object, and not some other type of data.

A "conservative reference" (or "ambiguous reference") is a reference that appears to refer to an object, but may be some other type of data instead.

A "live object" is an ambiguously referenced or precisely referenced object.

A "precisely referenced object" is an object that is precisely referenced in a root set and/or in a live object.

An "conservatively referenced object" is an object referenced by a conservative reference in a root set and/or by an conservative reference in a live object.

A "dead object" is an object that is not a live object.

Functional Overview

Figure 2:
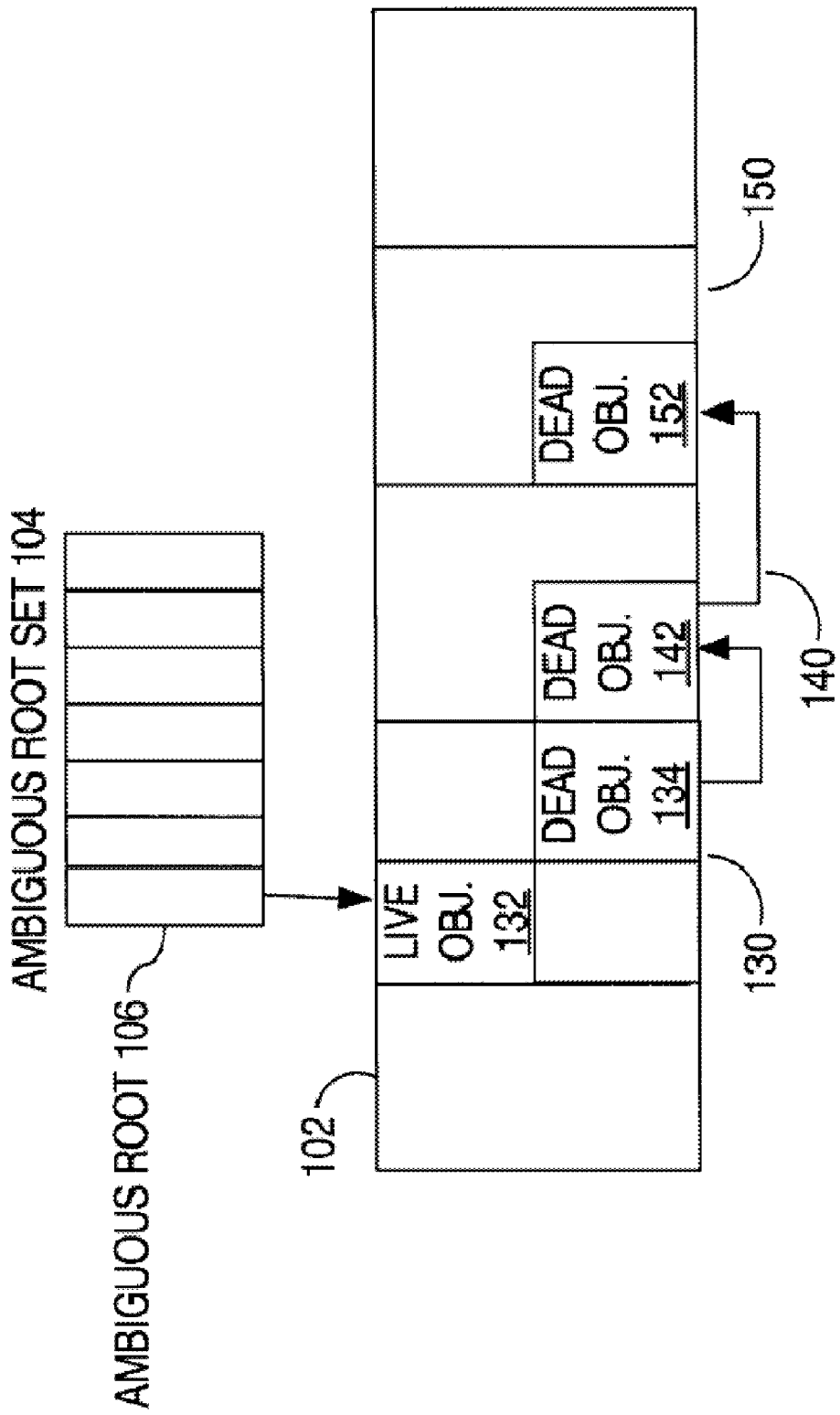
FIG. 2 is a block diagram showing objects in a semispace that are managed by a garbage collector using a conventional approach for copying garbage collection.

FIG. 2 shows structures that can be utilized in conventional garbage collectors. As shown, there is a from-space 102 and ambiguous root set 104. From-space 102 contains live object 132, and dead objects 134, 142, and 152. Garbage collection of objects in from-space 102 and its corresponding to-space (not shown) is performed by a garbage collector. Objects in from-space 102 and its corresponding to-space are sufficiently described to garbage collector 170 such that garbage collector 170 may discern boundaries between objects and the data structures contained within objects, as well as the data type of the data structures (i.e., integer, pointer).

Figure 3:
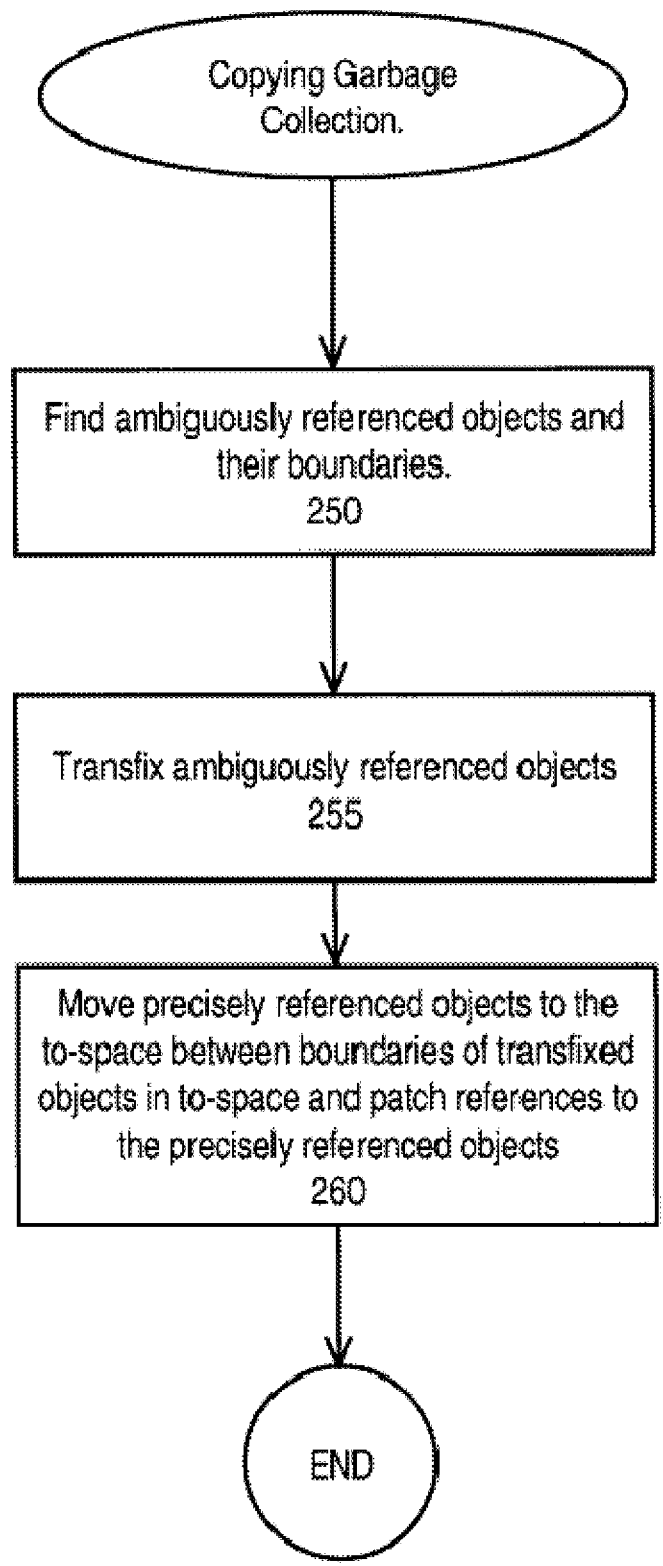
FIG. 3 is a high level flowchart showing a technique for copying garbage collection of objects stored in the semispace.

In order to more efficiently utilize memory, some systems utilize semispaces in order to manage objects, both in the to-space and the from space. FIG. 3 shows a high level flowchart showing a technique for copying garbage collection of objects stored in semispaces. The steps are executed by a garbage collector when invoked in response to detecting a variety of garbage collection events. Garbage collection events include, for example, insufficient memory to allocate for a new object, or the lapse of a threshold period of time. Each invocation of the garbage collector that is made for the purpose of reclaiming memory is referred to as a garbage collection cycle.

Referring to FIG. 3, at a step 250, ambiguously referenced objects in a from-space, and their boundaries, are found. At a step 255, the ambiguously referenced objects that are found in step 250 are transfixed. The term "transfixed" refers to the fact that the objects are left where they currently reside, and any references to them are preserved (i.e., not modified). At a step 260, the precisely referenced objects are moved into the to-space between the boundaries of any transfixed objects, and any references to the precisely referenced objects are patched.

After completing these steps, the only objects remaining in the from-space are the ambiguously referenced transfixed objects. The current from-space becomes the to-space, and the current to-space becomes the from-space, and the garbage collection cycle ends.

After performing garbage collection, memory for new objects is allocated from the from space. The memory is allocated from the memory areas between the transfixed objects that reside in the current from-space.

Exemplary Semispaces, Root Set, and Garbage Collector

The techniques described herein may be performed by a garbage collector that manages semispaces that are used to store a set of objects. The set of objects includes a subset of live objects, which are each referred to, directly or directly, by a reference in a root set. To facilitate a description of those techniques, an exemplary semispace, base root set, and garbage collector are described.

Figure 4:
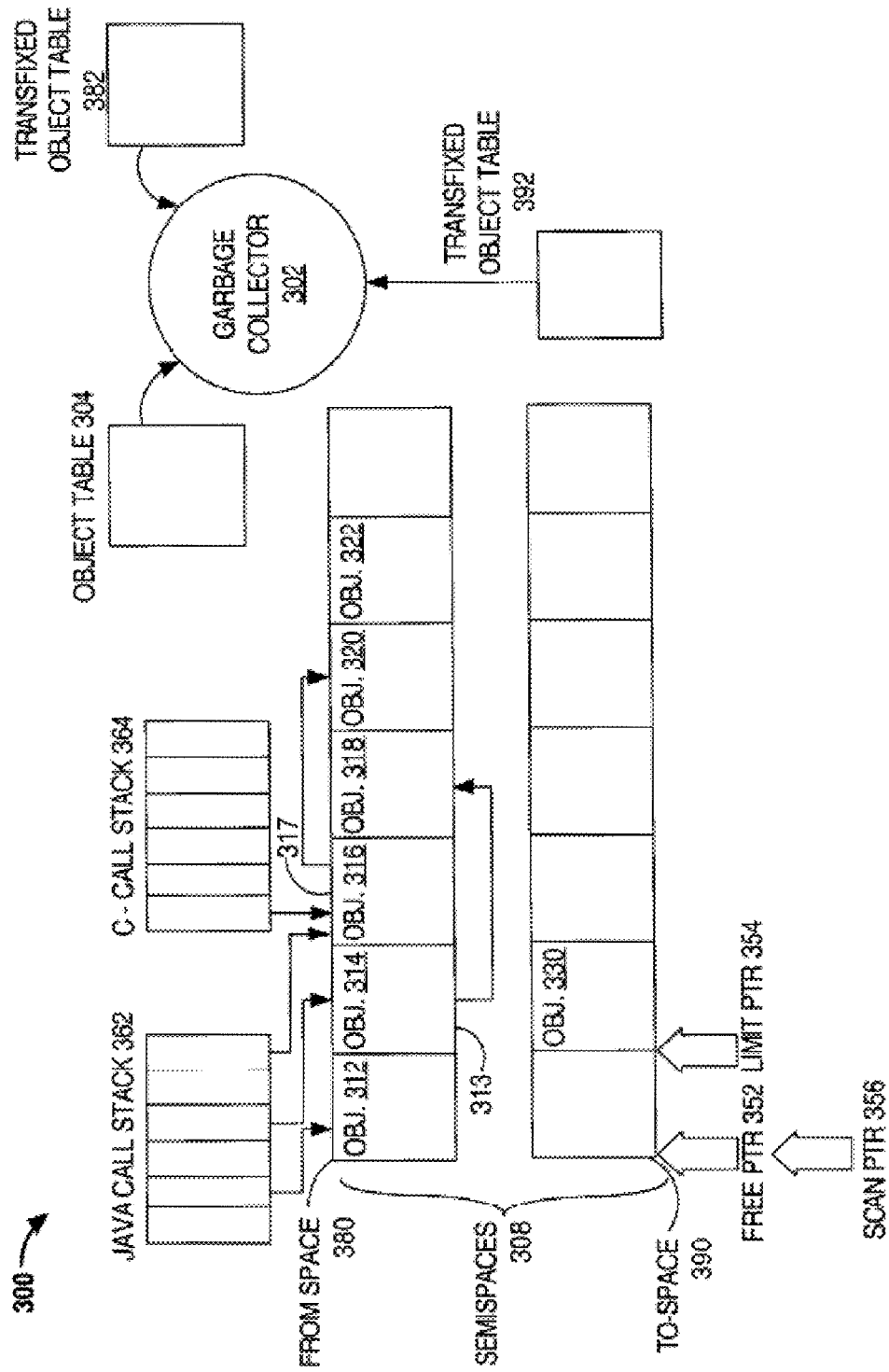
FIG. 4 is a block diagram depicting exemplary semispaces, root sets, and garbage collector.

Referring to FIG. 4, garbage collector 302 manages semispaces 308. Semispaces 308 include from-space 380 and to-space 390. From-space 380 is currently designated as the from-space, and to-space 390 is currently designated as the to-space. From-space 380 includes objects 312, 314, 316, 318, 320, and 322. To-space 390 includes transfixed object 330.

The base root set for objects in semispaces 308 include Java runtime stack 362 and C call stack 364. Data structures within Java runtime stack 362 are sufficiently described such that garbage collector 302 is able to discern data structures that are references to objects in semispaces 308 from other types of data structures within Java runtime stack 362. Likewise, objects in semispaces 308 are sufficiently described such that garbage collector 302 is able to discern data structures that are references to other objects in semispaces 308 from other data structures. C-call stack 364 on the other hand, may contain references to objects in semispaces 308 which may not be discerned by garbage collector 302. Therefore, C-call stack 364 is an ambiguous root set that may contain ambiguous references to objects within semispaces 308.

Object table 304 is data that indicates the boundaries between objects in semispaces 308. In one embodiment of the present invention, object table 304 is a bit vector table that specifies the memory address of the beginning boundary of an object. For example, object table 304 may contain data indicating that memory address 313 is the beginning boundary of object 314.

A transfixed object table, such as transfixed object tables 382 and 392, is provided for each of semispaces 308 (i.e., from-space 380 and to-space 390). A transfixed object table is data that indicates which objects in a particular semispace are transfixed. In an embodiment of the present invention, transfixed object table 382 is a bit vector table specifying the beginning boundaries of transfixed objects. For example, transfixed object table 392 contains data that specifies the beginning boundary of object 330, thus indicating that object 330 is transfixed. Data in transfixed object table 382 indicates that no object is transfixed in from-space 380. In another embodiment of the present inventions, transfixed object table 382 may be a table of pointers referring to each transfixed object.

Free pointer 352, limit pointer 354, and scan pointer 356 are pointers used by garbage collector 302 to manage the movement of objects between a from-space and a to-space. During garbage collection, free pointer 352 points to a memory location representing a memory address to which an object may be moved. Limit pointer 354 points to the memory address representing the beginning boundary of the transfixed object following the memory address pointed to by free pointer 352, or to the end of the to-space. Thus, the difference between free pointer 352 and limit pointer 354 represents the largest object that may be moved to the location pointed to by free pointer 352. As shall be described in further detail, scan pointer 356 is used to track, within the objects moved to the to-space, which reference is currently being used to trace live objects.

Outside of a garbage collection cycle, free pointer 352 and limit pointer 354 are used to manage the allocation of memory for new objects from the current from-space. Specifically, free pointer 352 is used to point to a memory location representing the start of a region of memory that is available for storing new objects. Limit pointer 354 points to the end of the region pointed to by free pointer 352. Thus, new objects may be stored in the region between pointers 352 and 354, but not to the area immediately beyond limit pointer 354. Limit pointer 354 points to the beginning boundary of the first transfixed object following the memory address pointed to by free pointer 352, or to the end of the from-space.

Figure 5:
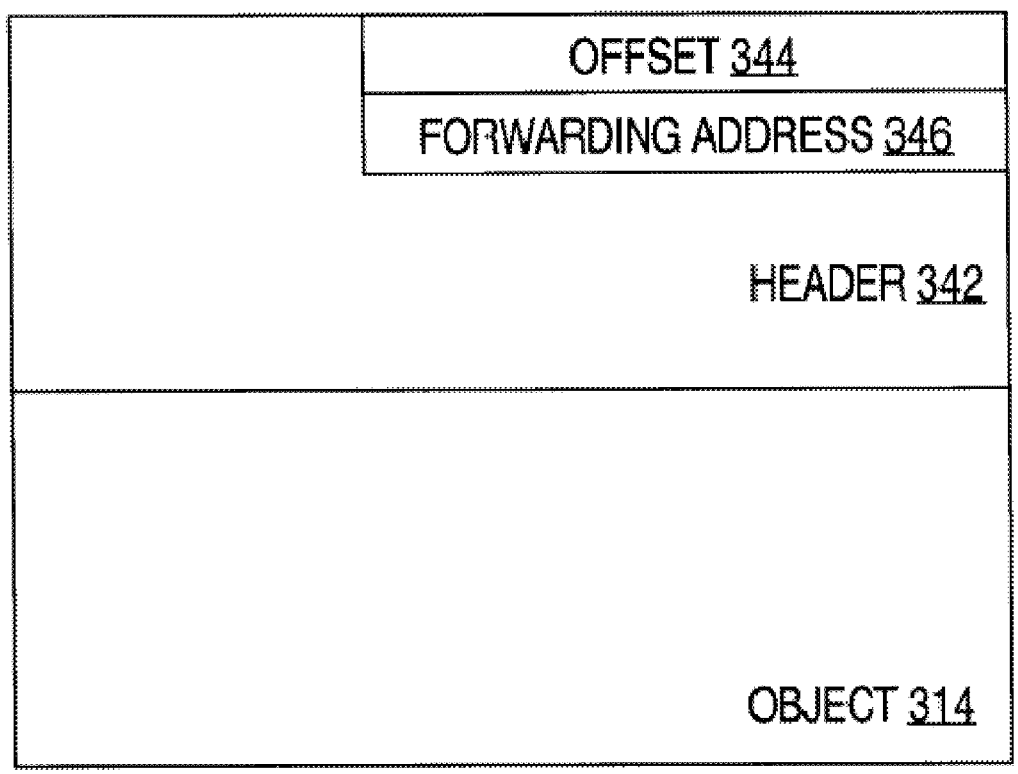
FIG. 5 is a block diagram depicting an exemplary object according to an embodiment of the present invention.

FIG. 5 shows object 314 in greater detail as one example. Object 314, like other objects stored in semispaces 308, contains header 342. Header 342 includes data describing object 314. For purposes of exposition, header 342 is depicted as including offset field 344 and forwarding address field 346. Offset field 344 is an offset to the memory address of the ending boundary of object 314. Thus, when the beginning boundary of object 314 is known, offset 344 also indicates the size of object 314. Forwarding address field 346 is data that indicates the forwarding address of an object. The forwarding address of an object is a reference to where a copy of the object resides in the to-space. A forwarding address field will only contain data in an object that has been moved during garbage collection, and only in the copy of the object that is left in the from-space during garbage collection.

While an expositive object format has been described, those skilled in the art will recognize that the object format may vary. For example, the header may contain a flag indicating that that an object has been moved to a forwarding address, and the forwarding address may be written in the object body that follows the header. The size of an object may not be stored explicitly, but may be calculated from information in the header (e.g., object type) and other data residing in the object. Such data may be overwritten by the forwarding address. Under these conditions, the size of an object may be determined from the copy in the to-space. It is therefore understood that the present invention is not limited to any particular object format.

Memory Management and Analysis of the Native Stack

As shown in FIG. 4, objects can be referenced from the Java call stack and the native call stack. The examples herein will describe the native call stack as being a C-call stack. However, embodiments of the invention are not limited to any specific language for either stack.

Embodiments of the invention can utilize synchronous backtrace logging where a call is made in the code to perform memory analysis and generate a log. Backtrace logging can be utilized to gather dynamic information such as the heap footprint and the dynamic context (e.g., function calls that led to the frame and reference of interest) as will be described in more detail below.

Figure 6:
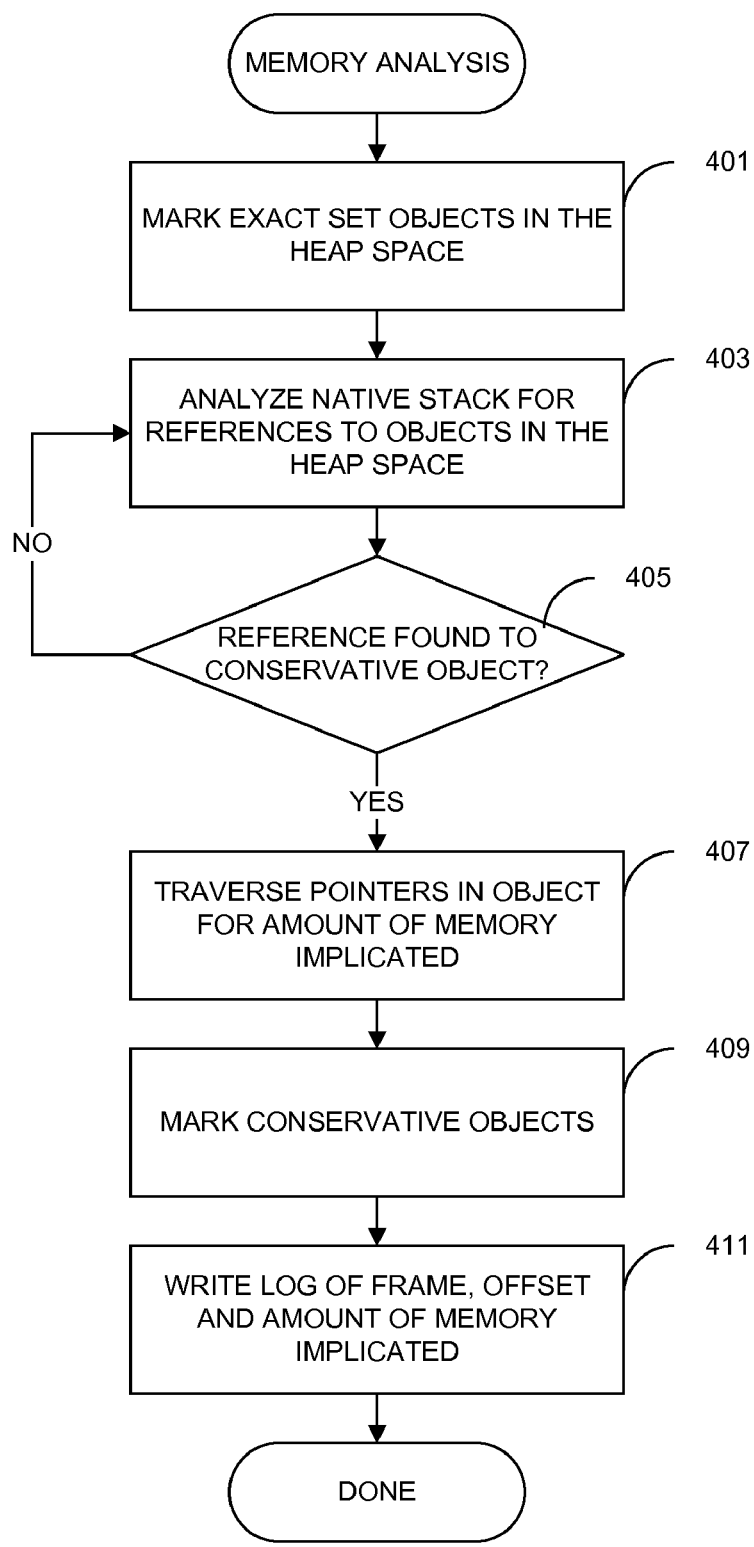
FIG. 6 is a flowchart of a process of analyzing a native stack to identify references that implicate memory (e.g., objects).

FIG. 6 is a flowchart of a process of analyzing a native stack to identify references that implicate memory (e.g., objects) in the heap. Although this flowchart may be implemented in some embodiments, steps can be added, deleted, combined, and reordered in other embodiments.

Figure 7:
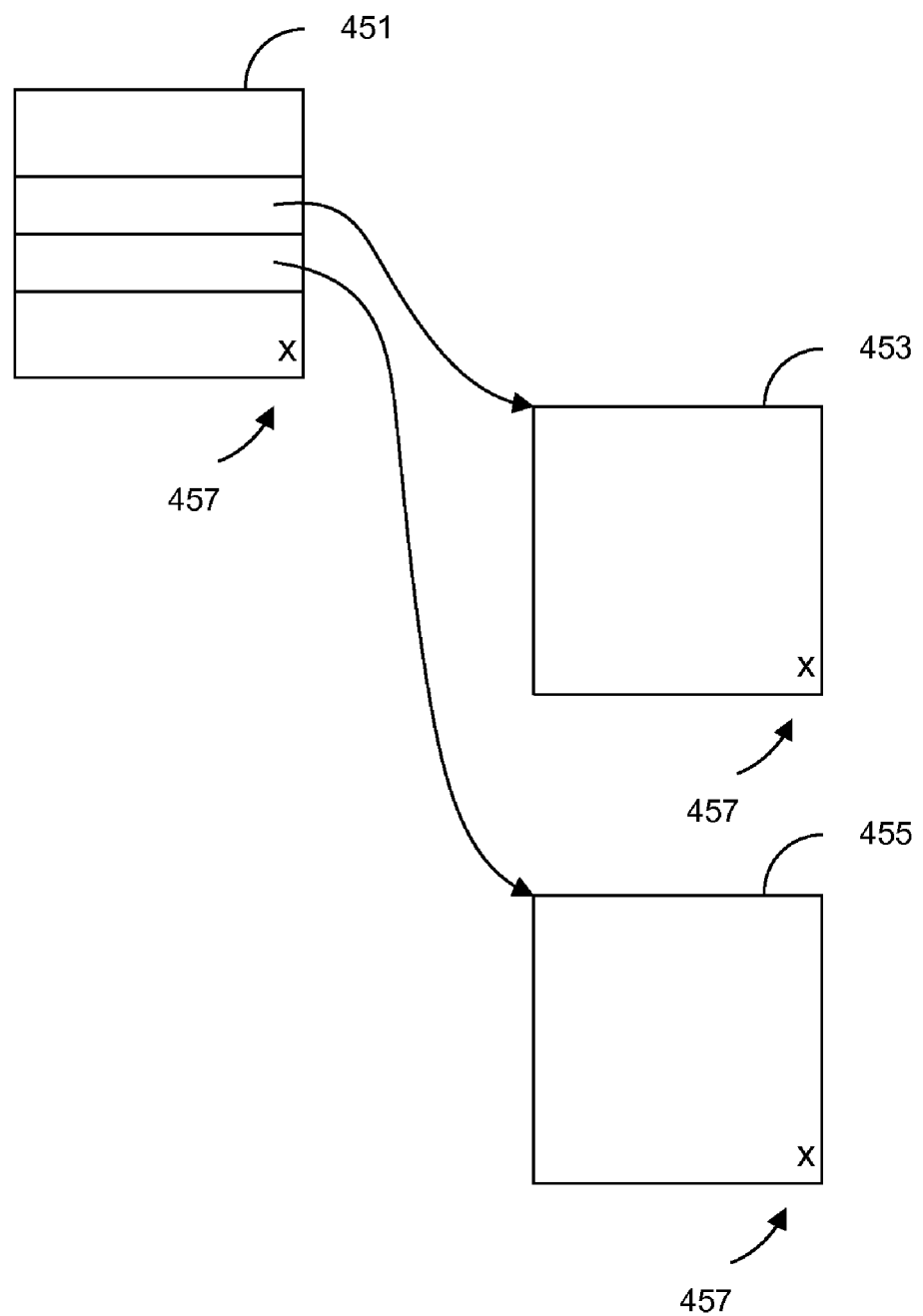
FIG. 7 shows a block diagram of an exact set of objects that have been marked so that the objects will not be moved.

At a step 401, the exact set of objects in the heap space are marked. These objects are referenced from the Java language portion of the program with references from the Java call stack. Typically, the exact set includes Java class statics and Java local variables. As marked, these objects are known to be live. FIG. 7 shows an example of how an example set of objects can be marked and will be discussed in more detail below.

Once the exact set is marked, the native stack is analyzed for references to objects in the heap space at a step 403. For example, the C stack is traversed from one end to the other. In some implementations, stacks grow to higher memory and in other implementations, stacks grow to lower memory. The actual way that the stacks grow can therefore vary by implementation.

Typically, the C stack is analyzed from program start to the invocation of the memory analysis call that began the process and will result in a log being generated. As the C stack is traversed, frames are identified. Frames refer to memory areas on the C stack that are associated with a specific function. The general organization of each frame on the C stack is known so the contents can be analyzed.

Once a frame is identified, potential references are analyzed to determine if they may refer to objects in the heap space. As the location of the heap space is known, memory locations that could be references are analyzed to see if the bit patterns reference the heap space. If the bit patterns do appear to reference the heap space, the reference is identified as a conservative reference to objects in the heap space.

It should be noted that the conservative reference may not, in fact, be a pointer in the C code to an object in the heap. For example, the bit pattern could just be data that through random chance appear like a reference to the heap. Additionally, the bit pattern could be residual data from a previous reference to the heap. At any rate, the reference is identified as potentially pointing to one or more objects in the heap space.

At a step 405, it is determined if a reference is found to a conservative object in the heap. If no, then the flow proceeds to step 403 where the C stack is further analyzed until the end is reached. If a conservative reference is found, the reference is utilized to determine how much memory is implicated by the object at a step 407. Also, pointers within the object to other conservative objects in the heap are traversed to determine the full amount of memory implicated. Further details on this will be described in more detail in reference to FIG. 8.

The conservative objects are marked at a step 409. The mark can entail the setting of a bit in the object to indicate that the object has been identified as a conservative object (see also FIG. 8 and the discussion therein). Other ways of marking the object known in the art including, but not limited to, storing a specific value in the object or maintaining an index to the object can be utilized in other embodiments.

At a step 411, a log is written that includes the frame, offset and amount of memory implicated by the conservative reference. The frame and offset is just one example of how the conservative reference can be identified. In other embodiments, sufficient debugging information can be generated with support of the compiler so as to identify the function that corresponds to the frame and/or local variables that correspond to references on the stack. Thus, embodiments include in the log identification of a reference on the native stack and an indication of an amount of memory implicated by the reference.

By analyzing the log, a user can determine places in the native code that implicate large amounts of memory, which may be the cause of memory problems in the program. Alternatively, the analysis can be done to make the program more efficient with memory usage even if it is operating correctly (e.g., for optimizing). By utilizing backtrace logging, the functions that were called are identified as the stack is traversed so the log can also include information about the series of functions that were called that led to the frame that includes the reference.

Now that FIG. 6 has been described, FIG. 7 shows a block diagram of an exact set of objects that have been marked so that the objects will not be moved (e.g., they are live). An object 451 has been identified as being in the exact set, such as a Java class static or local variable. Once found, the object is marked as indicated by an "X" 457. As mentioned above, the marking can be the setting of a bit in the object or any other way.

Object 451 is then analyzed and if references to other objects in the heap space are found, these objects are marked and traversed in a similar manner. Objects 453 and 455 are two additional objects that are referenced in object 451. As the sizes of the objects are known, the sum of the sizes of all the objects can be calculated to report to the user (e.g., in the log) of the amount of memory in the exact set.

Although only a single top level object is shown in FIG. 7, there are typically many such objects in the exact set and the objects can refer to other objects through many levels. However, the simple example illustrates the concept and marking of the exact set. This exact set will be utilized to illustrate the conservative marking of objects as well.

Figure 8:
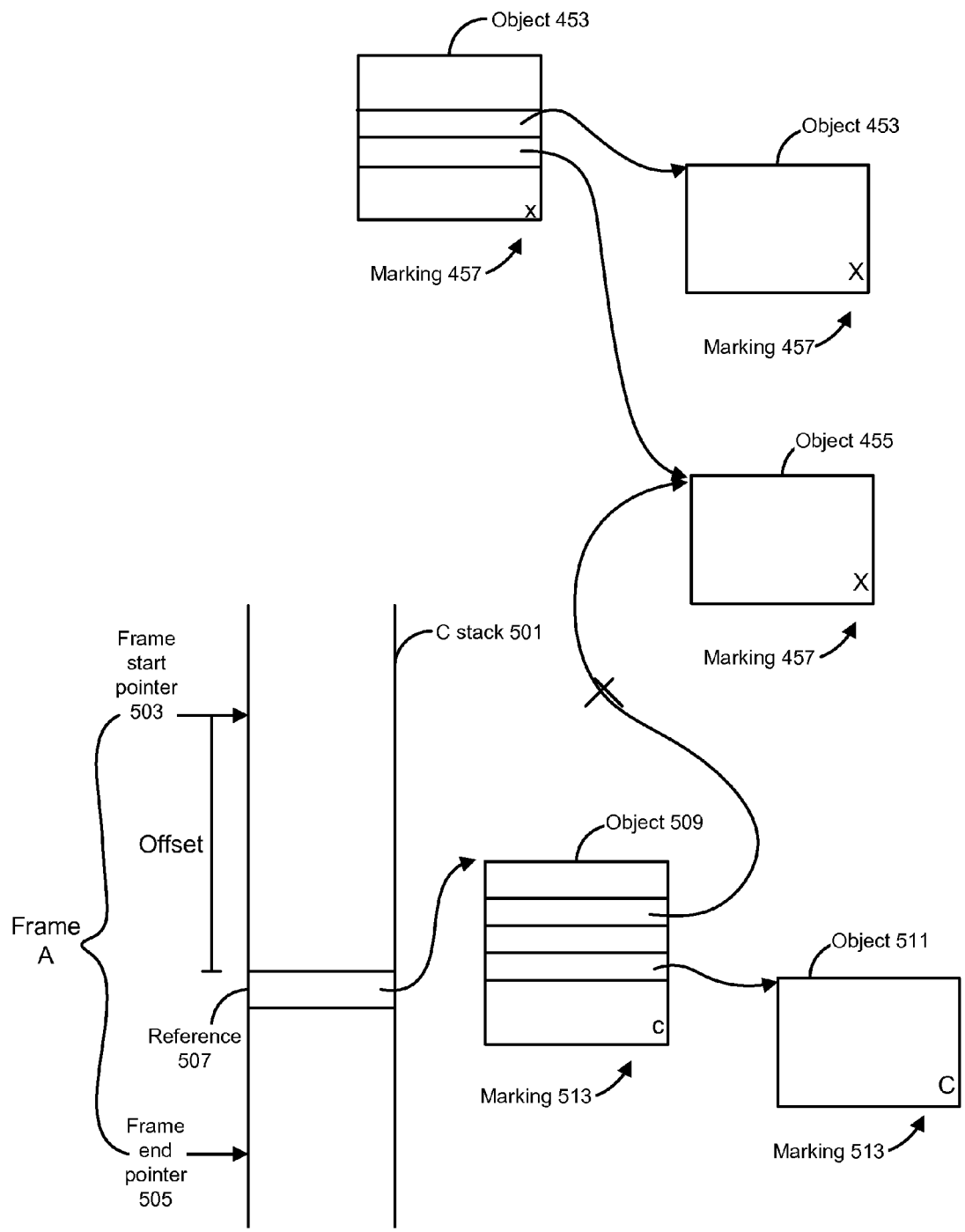
FIG. 8 shows a block diagram of a reference found on the native stack that implicates memory and how the amount of memory can be identified.

FIG. 8 shows a block diagram of a reference found on the native stack that implicates memory and how the amount of memory can be identified. The exact set is shown the same as in FIG. 7.

Once the memory analysis is begun, C stack 501 is analyzed from one end to the other. Frames are identified, such as frame A delineated by a frame start pointer 503 and a frame end pointer 505, which simply refer to the locations on the stack where the frame begins and ends. The frame location can also be identified by the start point and length in other embodiments.

As shown, a reference 507 has been identified within frame A that points to an object in the heap space, object 509. Object 509 also includes references to other objects in the heap, namely objects 455 and 511.

In order to determine how much memory is implicated by reference 507, the objects are traversed and the amount of memory is tallied. As the objects are traversed, they can be marked in a way similar to the way the exact set was marked. Objects 509 and 511 are shown marked with a "C" 513 to indicate they are conservative objects. As object 455 is a part of the exact set, it has already been marked.

It is very beneficial to know the amount of any memory (precise and conservative) implicated by a conservative reference, which can be written to a log. In some embodiments, objects that are in the exact set, such as object 455, are not included in this calculation. To show this, the link to object 455 from object 509 is shown with an "X" on it.

The amount of memory from objects 509 and 511 can be written to the log as being implicated by the reference 507.

Additionally, this amount of memory can be added to the total memory utilized by the program, which may also be written to the log.

In the example shown in FIG. 8, the marks on the objects in the exact set and conservative objects were different. This can be advantageous to readily determine how the memory was implicated. In other embodiments, the markings could be the same, if desired.

As illustrated by FIG. 8, the C stack is traversed in the analysis. This analysis allows the calls from different routines or functions to be traced. In some embodiments of the invention, the log also includes a trace of the routines that were called in the log. This provides the user with information about the routines that led up to the conservative reference or references at issue.

For example, if a conservative reference is found in the frame for a function "foo." It might be significant whether the function that called foo was the function "bar" or a different function. The series of frames or functions that led to the reference gives context to the reference. In embodiments of the invention, the frame, the function or both can be conveyed to the user in the log.

Advantages of the invention include that memory that is implicated by the native stack can be readily identified without requiring a special test case. Additionally, the amount of memory that is implicated and the location of the reference that implicates the memory is identified. This can be very beneficial for identifying memory problems and also for generating a solution, such as a change in source code. This can save literally hours and days of debug time.

Additionally, embodiments of the invention do not unduly impact the performance of the program being analyzed. Debug solutions that drastically impact the performance of the program being analyzed can have an affect on the operation of the program, thereby making the results unpredictable.

While the above is a complete description of preferred embodiments of the invention, various alternatives, modifications, and equivalents can be used. It should be evident that the invention is equally applicable by making appropriate modifications to the embodiments described above. For example, although properties of specific embodiments have been described, embodiments of the invention are not limited to these properties. Therefore, the above description should not be taken as limiting the scope of the invention that is defined by the metes and bounds of the appended claims along with their full scope of equivalents.

What is claimed is:

1. A method of analyzing memory usage with conservative garbage collection, comprising:
   analyzing a native stack to identify a reference in a frame to a first object in a heap, wherein the first object is in a first set;
   analyzing the first object to identify a reference to a second object in the heap, wherein the second object is in the first set;
   analyzing the native stack to identify a reference to a third object in the heap, wherein the third object is not in the first set;
   determining an amount of memory implicated by the reference in the frame upon reference to the first object in the heap, wherein the amount of memory implicated includes an amount of memory used by the first and second objects and not the third object; and
   conveying to a user the frame, a location of the reference in the frame, and the amount of memory implicated by the first object in the heap.

2. The method of claim 1, wherein the reference in the frame to the first object is a conservative reference.

3. The method of claim 1, wherein the conveying to a user comprises writing the frame, the location of the reference in the frame and the amount of memory for the first object to a log.

4. The method of claim 1, further comprising conveying to the user a plurality of frames on the stack that provide context for the reference in the frame to the first object.

5. The method of claim 1, wherein determining an amount of memory implicated by the reference comprises identifying other objects in the heap that are in the first set referenced by the first object.

6. The method of claim 5, further comprising recursively traversing the other objects to identify still further objects that are in the first set.

7. The method of claim 1, further comprising marking the first object as being in the first set.

8. The method of claim 7, wherein the first set comprises Java class statics and Java local variables.

9. The method of claim 7, wherein the marking the first object as being in the first set comprises setting a bit in the object.

10. The method of claim 1, wherein the amount of memory is a number.

11. The method of claim 1, wherein the analyzing a native stack comprises traversing the stack from one end of the stack to the other end of the stack.

12. The method of claim 11, wherein the traversing the stack comprises identifying called functions that led to the frame that includes the references.

13. The method of claim 1, wherein the conveying to a user the frame, a location of the reference in the frame, and the amount of memory implicated by the object comprises:
   showing on a computer display the frame, the location of the reference in the frame, and the amount of memory implicated by the first object.

14. A computer program product for execution by a computer that analyzes memory usage with conservative garbage collection, comprising:
   computer code for analyzing a native stack to identify a reference in a frame to a first object in a heap, wherein the first object is in a first set;
   computer code for analyzing the first object to identify a reference to a second object in the heap, wherein the second object is in the first set;
   computer code for analyzing the native stack to identify a reference in the frame to a third object in a heap, wherein the third object is not in the first set;
   computer code for determining an amount of memory implicated by the reference in the frame upon reference to the first object in the heap, wherein the amount of memory implicated includes an amount of memory used by the first and second objects in the first set, but not the third object not in the first set;
   computer code for conveying to a user the frame, a location of the reference in the frame, and the amount of memory implicated by the first object in the heap;
   a computer-readable medium that stores the computer codes.

15. The computer program product of claim 14, wherein the computer-readable medium is a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, or any other memory chip or cartridge.

16. A system for analyzing memory usage with conservative garbage collection, comprising:
- a means for analyzing a native stack to identify a reference in a frame to a first object in a heap when a memory location in the frame comprises a bit pattern reference to the heap;
- a means for determining a first amount of memory used by the reference in the frame to the first object, wherein the first object references a second object comprising a bit pattern reference to the heap, and the first object references a third object not comprising a bit pattern reference to the heap;
- a means for determining a second amount of memory used by the second object;
- a means for determining an amount of memory implicated by reference in the frame to the first object comprising summing the first amount of memory and second amount of memory and not the third amount of memory used by the third object; and
- a means for conveying to a user the frame, a location of the reference in the frame, and the amount of memory implicated by the first object in the heap.

17. A method of analyzing memory usage with conservative garbage collection, comprising:
- marking first objects in an exact set in a heap;
- analyzing a native stack to identify a reference in a frame to a second object in the heap, the second object being one of the first objects in the exact set;
- analyzing the second object to identify a reference to a third object in the heap, wherein the third object is not one of the first objects in the exact set;
- determining an amount of memory implicated by the reference upon reference to the second object, wherein the amount of memory implicated includes an amount of memory used by the third object but not the second object; and
- conveying to a user the frame, a location of the reference in the frame, and the amount of memory implicated by the second object.

18. The method of claim 17, wherein the reference in the frame is a conservative reference.

19. The method of claim 17, wherein the conveying to a user comprises writing the frame, the location of the reference in the frame and the amount of memory implicated for the second object to a log.

20. The method of claim 17, further comprising conveying to the user a plurality of frames on the stack that provide context for the reference in the frame.

21. The method of claim 17, further comprising conveying to a user amounts of memory used by the third and second objects.

22. The method of claim 21, further comprising recursively traversing the second object to identify still further objects.

23. The method of claim 17, further comprising marking objects that are referenced in the native stack and are not in the exact set as being conservative objects.

24. The method of claim 17, wherein the amount of memory is a number.

25. The method of claim 17, wherein the analyzing a native stack comprises traversing the stack from one end of the stack to the other end of the stack.

26. The method of claim 17, wherein the exact set comprises Java class statics and Java local variables.

27. The method of claim 17, wherein the marking first objects in an exact set comprises setting a bit in the object.

28. The method of claim 17 wherein the conveying to a user the frame, a location of the reference in the frame, and the amount of memory implicated by the first object comprises:
- showing on a computer display the frame, the location of the reference in the frame, and the amount of memory implicated by the first object.

29. A computer program product for execution by a computer that analyzes memory usage with conservative garbage collection, comprising:
- computer code for marking objects in an exact set in a heap;
- computer code for analyzing a native stack to identify a reference in a frame to a first object in a heap, the first object not being in the exact set;
- computer code for recursively traversing the first object to identify a second object in the heap which is in the exact set;
- computer code for recursively traversing the second object to identify a third object in the heap which is not in the exact set;
- computer code for determining an amount of memory implicated by the reference upon reference to the first object, the amount of memory implicated comprising memory used by the first and third objects but not the second;
- computer code for conveying to a user the frame, a location of the reference in the frame, and the amount of memory implicated by the object; and
- a computer-readable medium that stores the computer codes.

30. The computer program product of claim 29, wherein the computer-readable medium is a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, or any other memory chip or cartridge.

31. A system for analyzing memory usage with conservative garbage collection, comprising:
- a means for marking first objects in an exact set in a heap;
- a means for analyzing a native stack to identify a reference in a frame to a second object in a heap when a memory analysis call is invoked, the second object being one of the first objects in the exact set;
- a means for analyzing the traversing the object in the heap to identify references to third objects which are not in the exact set and not found in the native stack;
- a means for determining an amount of memory implicated by the reference upon reference to the second object, wherein the amount of memory implicated comprises an amount of memory used by the third objects, which does not include an amount of memory used by the second object; and
- a means for conveying to a user the frame, a location of the reference in the frame, and the amount of memory implicated by the object.

* * * * *